(12) United States Patent
Ye et al.

(10) Patent No.: US 9,885,919 B2
(45) Date of Patent: Feb. 6, 2018

(54) DISPLAY PANEL AND METHOD FOR MANUFACTURING THE SAME

(71) Applicant: SHENZHEN CHINA STAR OPTOELECTRONICS TECHNOLOGY CO., LTD., Shenzhen, Guangdong (CN)

(72) Inventors: Yanxi Ye, Guangdong (CN); Yang Zhao, Guangdong (CN); Chung Yi Chiu, Guangdong (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 184 days.

(21) Appl. No.: 14/648,920

(22) PCT Filed: Mar. 10, 2015

(86) PCT No.: PCT/CN2015/073922
§ 371 (c)(1),
(2) Date: Jun. 2, 2015

(87) PCT Pub. No.: WO2016/138673
PCT Pub. Date: Sep. 9, 2016

(65) Prior Publication Data
US 2016/0377927 A1    Dec. 29, 2016

(30) Foreign Application Priority Data
Mar. 4, 2015    (CN) .......................... 2015 1 0095685

(51) Int. Cl.
*G02F 1/1337*    (2006.01)
*G02F 1/1335*    (2006.01)
(Continued)

(52) U.S. Cl.
CPC ...... *G02F 1/133753* (2013.01); *G02F 1/1368* (2013.01); *G02F 1/13439* (2013.01);
(Continued)

(58) Field of Classification Search
CPC ... G02F 1/133753; G02F 2001/133761; G02F 1/136286; G02F 1/133514; G02F 1/1368;
(Continued)

(56) References Cited

U.S. PATENT DOCUMENTS

2005/0030458 A1* 2/2005 Sasabayashi ..... G02F 1/133707
349/129
2007/0120092 A1* 5/2007 Kataoka ............ G02F 1/133707
252/299.61
(Continued)

FOREIGN PATENT DOCUMENTS

CN    101055379 A    10/2007
CN    102360141 A    2/2012
(Continued)

*Primary Examiner* — Ryan Crockett
*Assistant Examiner* — Mariam Qureshi
(74) *Attorney, Agent, or Firm* — Soroker Agmon Nordman

(57) ABSTRACT

A display panel and a method for manufacturing the same are disclosed. The display panel includes a color filter substrate, a liquid crystal layer, and a thin film transistor array substrate. Each of pixel units of the thin film transistor array substrate includes a first, second, third, and fourth domains. Liquid crystal molecules corresponding to the first, second, third, and fourth domains respectively have a first, second, third, and fourth pretilt angles. The present invention can increase the display quality of the display panel at the observation viewing angles with the large viewing angles.

8 Claims, 13 Drawing Sheets

(51) Int. Cl.
*G02F 1/1343* (2006.01)
*G02F 1/1362* (2006.01)
*G02F 1/1368* (2006.01)

(52) U.S. Cl.
CPC .. *G02F 1/133514* (2013.01); *G02F 1/133707* (2013.01); *G02F 1/134309* (2013.01); *G02F 1/136286* (2013.01); *G02F 2001/133761* (2013.01); *G02F 2001/134345* (2013.01); *G02F 2201/123* (2013.01)

(58) Field of Classification Search
CPC ........... G02F 1/13439; G02F 1/134309; G02F 2001/134345
See application file for complete search history.

(56) References Cited

U.S. PATENT DOCUMENTS

| | | | | |
|---|---|---|---|---|
| 2010/0123867 | A1* | 5/2010 | Jung | G02F 1/133753 |
| | | | | 349/141 |
| 2012/0075562 | A1* | 3/2012 | Yeh | G02F 1/1323 |
| | | | | 349/139 |
| 2012/0293763 | A1* | 11/2012 | Inoue | G02F 1/133788 |
| | | | | 349/178 |
| 2013/0093987 | A1 | 4/2013 | Kang | |
| 2016/0147112 | A1* | 5/2016 | Chae | G02F 1/133514 |
| | | | | 349/106 |

FOREIGN PATENT DOCUMENTS

| | | |
|---|---|---|
| CN | 103513472 A | 1/2014 |
| JP | 2011158653 A | 8/2011 |

\* cited by examiner

THE FIRST DOMAIN, THE SECOND DOMAIN, THE THIRD DOMAIN, AND THE FOURTH DOMAIN ARE DISPOSED IN EACH OF THE PIXEL UNITS OF THE THIN FILM TRANSISTOR ARRAY SUBSTRATE, SUCH THAT THE GROOVES OF THE FIRST PIXEL ELECTRODES IN THE FIRST DOMAIN HAVE THE FIRST DEPTH, THE GROOVES OF THE SECOND PIXEL ELECTRODES IN THE SECOND DOMAIN HAVE THE SECOND DEPTH, THE GROOVES OF THE THIRD PIXEL ELECTRODES IN THE THIRD DOMAIN HAVE THE THIRD DEPTH, AND THE GROOVES OF THE FOURTH PIXEL ELECTRODES IN THE FOURTH DOMAIN HAVE THE FOURTH DEPTH — 1201

THE THIN FILM TRANSISTOR ARRAY SUBSTRATE AND THE COLOR FILTER SUBSTRATE ARE STACKED UP AND ASSEMBLED TOGETHER — 1202

THE LIQUID CRYSTAL LAYER IS DISPOSED BETWEEN THE THIN FILM TRANSISTOR ARRAY SUBSTRATE AND THE COLOR FILTER SUBSTRATE, SUCH THAT THE FIRST LIQUID CRYSTAL MOLECULES IN THE FIRST DOMAIN, THE SECOND LIQUID CRYSTAL MOLECULES IN THE SECOND DOMAIN, THE THIRD LIQUID CRYSTAL MOLECULES IN THE THIRD DOMAIN, AND THE FOURTH LIQUID CRYSTAL MOLECULES IN THE FOURTH DOMAIN RESPECTIVELY HAVE THE FIRST PRETILT ANGLE, THE SECOND PRETILT ANGLE, THE THIRD PRETILT ANGLE, AND THE FOURTH PRETILT ANGLE — 1203

FIG. 12

THE PIXEL ELECTRODES ARE DISPOSED IN THE FIRST DOMAIN, THE SECOND DOMAIN, THE THIRD DOMAIN, AND THE FOURTH DOMAIN, SUCH THAT THE FIRST DEPTH OF THE GROOVES OF THE FIRST PIXEL ELECTRODES IN THE FIRST DOMAIN, THE SECOND DEPTH OF THE GROOVES OF THE SECOND PIXEL ELECTRODES IN THE SECOND DOMAIN, THE THIRD DEPTH OF THE GROOVES OF THE THIRD PIXEL ELECTRODES IN THE THIRD DOMAIN, AND THE FOURTH DEPTH OF THE GROOVES OF THE FOURTH PIXEL ELECTRODES IN THE FOURTH DOMAIN ARE ALL THE SAME ~12011

THE PIXEL ELECTRODES IN THE FIRST DOMAIN AND THE SECOND DOMAIN ARE ETCHED, SUCH THAT THE FIRST DEPTH AND THE SECOND DEPTH ARE SMALLER THAN THE THIRD DEPTH ~12012

FIG. 13

```
┌─────────────────────────────────────┐
│   THE PIXEL ELECTRODES ARE DISPOSED IN   │
│   THE FIRST DOMAIN, THE SECOND DOMAIN,   │
│     THE THIRD DOMAIN, AND THE FOURTH     │
│   DOMAIN, SUCH THAT THE FIRST DEPTH OF   │
│       THE GROOVES OF THE FIRST PIXEL     │
│   ELECTRODES IN THE FIRST DOMAIN, THE    │──12013
│   SECOND DEPTH OF THE GROOVES OF THE     │
│  SECOND PIXEL ELECTRODES IN THE SECOND   │
│     DOMAIN, THE THIRD DEPTH OF THE       │
│  GROOVES OF THE THIRD PIXEL ELECTRODES   │
│    IN THE THIRD DOMAIN, AND THE FOURTH   │
│    DEPTH OF THE GROOVES OF THE FOURTH    │
│   PIXEL ELECTRODES IN THE FOURTH DOMAIN  │
│              ARE ALL THE SAME            │
└─────────────────────────────────────┘
                    │
                    ▼
┌─────────────────────────────────────┐
│    THE PIXEL ELECTRODES IN THE FIRST     │
│   DOMAIN, THE SECOND DOMAIN, AND THE     │
│   FOURTH DOMAIN ARE ETCHED, SUCH THAT    │──12014
│   THE FIRST DEPTH, THE SECOND DEPTH, AND │
│   THE FOURTH DEPTH ARE ALL SMALLER THAN  │
│              THE THIRD DEPTH             │
└─────────────────────────────────────┘
```

FIG. 14

DISPLAY PANEL AND METHOD FOR MANUFACTURING THE SAME

BACKGROUND OF THE INVENTION

1. Field of the Invention

The present invention generally relates to a display technical field, and more particularly to a display panel and a method for manufacturing the same.

2. Description of Prior Art

At a large viewing angle of a conventional large-size display panel, a washout phenomenon is serious.

The conventional large-size display panel is mainly applied to a television in a living room of a house and an advertising board in a public place.

In a scene of the living room of the house, a user walks back and forth in the living room of the house, so a requirement for the washout at the left and right angles (azimuth angles 0 degree/180 degrees) is high.

The advertising board is usually at a high position, so a requirement for the washout at the downward viewing angle (azimuth angle 270 degrees) is high.

As shown in FIG. 1, in the first type of the conventional display panel 101, areas of four domains 1011, 1012, 1013, and 1014 of a subpixel are the same. FIG. 2 shows a gamma simulation diagram acquired by performing a gamma simulation to the subpixel of the above-mentioned conventional display panel 101. Amongst, at a large viewing angle of 60 degrees, gamma curves (C1_0_60, C1_90_60, C1_180_60, and C1_270_60) at four azimuth angles of the display panel are the same. That is, at the large viewing angle, the washout situations at the four azimuth angles are the same. Amongst, the curves C1_0_60, C1_90_60, C1_180_60, and C1_270_60 respectively represent gamma curves with respect to directions corresponding to the first azimuth 0 degree, the second azimuth 90 degrees, the third azimuth 180 degrees, and the fourth azimuth 270 degrees at the large viewing angle of 60 degrees of the display panel 101. The curve C1_0_0 represents a gamma curve with respect to a direction corresponding to the first azimuth 0 degree at a viewing angle of 0 degree of the display panel 101.

As shown in FIG. 2, in the other type of the conventional display panel 301, areas of domains 3011 and 3012 in an upper part of a subpixel are smaller than areas of domains 3013 and 3014 in a lower part. FIG. 4 shows a gamma simulation diagram acquired by performing a gamma simulation to the subpixel of the above-mentioned conventional display panel 301. Amongst, curves C2_0_60, C2_90_60, C2_180_60, and C2_270_60 respectively represent gamma curves with respect to directions corresponding to the first azimuth 0 degree, the second azimuth 90 degrees, the third azimuth 180 degrees, and the fourth azimuth 270 degrees at the large viewing angle of 60 degrees of the display panel 301. The curve C1_0_0 represents a gamma curve with respect to a direction corresponding to the first azimuth 0 degree at the viewing angle of 0 degree of the display panel 301. It can be seen from FIG. 4 that the gamma curve at the downward viewing angle is more close to the gamma curve at the viewing angle of 0 degree, while the washout effect at the upward viewing angle is worst.

In summary, at specific viewing angles, the conventional large-size display panels cannot provide images with good display quality for a user.

Consequently, there is a need to provide a new technical scheme for solving the above-mentioned problems in the prior art.

SUMMARY OF THE INVENTION

An objective of the present invention is to provide a display panel and a method for manufacturing the same which can be beneficial to improve the washout phenomenon at observation viewing angles with large viewing angles of a large-size display panel, thereby increasing the display quality of the large-size display panel at the observation viewing angles with the large viewing angles.

To solve the above-mentioned problems, a technical scheme of the present invention is described as follows. A display panel comprises a color filter substrate, a liquid crystal layer, and a thin film transistor array substrate. The thin film transistor array substrate, the liquid crystal layer, and the color filter substrate are stacked up and assembled together. The thin film transistor array substrate comprises at least two pixel units. The at least two pixel units are arranged in an array. Each of the pixel units comprises: a first domain disposed in an upper right quadrant of the pixel unit, first liquid crystal molecules corresponding to the first domain have a first pretilt angle; a second domain disposed in an upper left quadrant of the pixel unit, second liquid crystal molecules corresponding to the second domain have a second pretilt angle; a third domain disposed in a lower left quadrant of the pixel unit, third liquid crystal molecules corresponding to the third domain have a third pretilt angle; and a fourth domain disposed in a lower right quadrant of the pixel unit, fourth liquid crystal molecules corresponding to the fourth domain have a fourth pretilt angle. The first domain and the second domain are arranged in a first direction. The third domain and the fourth domain are arranged in an opposite direction of the first direction. The first domain and the fourth domain are arranged in a second direction. The second domain and the third domain are arranged in the second direction. The first direction is perpendicular to the second direction. Grooves of first pixel electrodes in the first domain have a first depth, and the first depth corresponds to the first pretilt angle. Grooves of second pixel electrodes in the second domain have a second depth, and the second depth corresponds to the second pretilt angle. Grooves of third pixel electrodes in the third domain have a third depth, and the third depth corresponds to the third pretilt angle. Grooves of fourth pixel electrodes in the fourth domain have a fourth depth, and the fourth depth corresponds to the fourth pretilt angle. The thin film transistor array substrate further comprises at least one data line and at least one scan line, and the data line and the scan line are electrically connected to a thin film transistor switch of the pixel unit.

In the above-mentioned display panel, an area of the first domain is equal to an area of the second domain. An area of the third domain is equal to an area of the fourth domain. The third pretilt angle is smaller than the first pretilt angle and the second pretilt angle. The fourth pretilt angle is smaller than the first pretilt angle and the second pretilt angle. The first pretilt angle is ranged from 86 degrees to 89 degrees. The third pretilt angle is ranged from 81 degrees to 85 degrees.

In the above-mentioned display panel, an area of the second domain is smaller than an area of the first domain. An area of the third domain is greater than the area of the second domain. An area of the fourth domain is greater than the area of the third domain. The third pretilt angle is smaller than the first pretilt angle, the second pretilt angle, and the fourth pretilt angle. The first pretilt angle is ranged from 86 degrees to 89 degrees. The third pretilt angle is ranged from 81 degrees to 85 degrees.

A display panel comprises a color filter substrate, a liquid crystal layer, and a thin film transistor array substrate. The thin film transistor array substrate, the liquid crystal layer, and the color filter substrate are stacked up and assembled together. The thin film transistor array substrate comprises at least two pixel units. The at least two pixel units are arranged in an array. Each of the pixel units comprises: a first domain disposed in an upper right quadrant of the pixel unit, first liquid crystal molecules corresponding to the first domain have a first pretilt angle; a second domain disposed in an upper left quadrant of the pixel unit, second liquid crystal molecules corresponding to the second domain have a second pretilt angle; a third domain disposed in a lower left quadrant of the pixel unit, third liquid crystal molecules corresponding to the third domain have a third pretilt angle; and a fourth domain disposed in a lower right quadrant of the pixel unit, fourth liquid crystal molecules corresponding to the fourth domain have a fourth pretilt angle. The first domain and the second domain are arranged in a first direction. The third domain and the fourth domain are arranged in an opposite direction of the first direction. The first domain and the fourth domain are arranged in a second direction. The second domain and the third domain are arranged in the second direction. The first direction is perpendicular to the second direction.

In the above-mentioned display panel, grooves of first pixel electrodes in the first domain have a first depth, and the first depth corresponds to the first pretilt angle. Grooves of second pixel electrodes in the second domain have a second depth, and the second depth corresponds to the second pretilt angle. Grooves of third pixel electrodes in the third domain have a third depth, and the third depth corresponds to the third pretilt angle. Grooves of fourth pixel electrodes in the fourth domain have a fourth depth, and the fourth depth corresponds to the fourth pretilt angle.

In the above-mentioned display panel, an area of the first domain is equal to an area of the second domain. An area of the third domain is equal to an area of the fourth domain. The third pretilt angle is smaller than the first pretilt angle and the second pretilt angle. The fourth pretilt angle is smaller than the first pretilt angle and the second pretilt angle.

In the above-mentioned display panel, the first pretilt angle is ranged from 86 degrees to 89 degrees. The third pretilt angle is ranged from 81 degrees to 85 degrees.

In the above-mentioned display panel, the first pretilt angle and the second pretilt angle are both ranged from 87 degrees to 89 degrees. The third pretilt angle and the fourth pretilt angle are both ranged from 82 degrees to 84 degrees.

In the above-mentioned display panel, the first pretilt angle and the second pretilt angle are both 88 degrees. The third pretilt angle and the fourth pretilt angle are both 83 degrees.

In the above-mentioned display panel, an area of the second domain is smaller than an area of the first domain. An area of the third domain is greater than the area of the second domain. An area of the fourth domain is greater than the area of the third domain. The third pretilt angle is smaller than the first pretilt angle, the second pretilt angle, and the fourth pretilt angle.

In the above-mentioned display panel, the first pretilt angle is ranged from 86 degrees to 89 degrees. The third pretilt angle is ranged from 81 degrees to 85 degrees.

In the above-mentioned display panel, the first pretilt angle, the second pretilt angle, and the fourth pretilt angle are all ranged from 87 degrees to 89 degrees. The third pretilt angle is ranged from 82 degrees to 84 degrees.

In the above-mentioned display panel, the first pretilt angle, the second pretilt angle, and the fourth pretilt angle are all 88 degrees. The third pretilt angle is 83 degrees.

A method for manufacturing a display panel comprises the following steps: A. the first domain, the second domain, the third domain, and the fourth domain are disposed in each of the pixel units of the thin film transistor array substrate, such that grooves of first pixel electrodes in the first domain have a first depth, grooves of second pixel electrodes in the second domain have a second depth, grooves of third pixel electrodes in the third domain have a third depth, and grooves of fourth pixel electrodes in the fourth domain have a fourth depth; B. the thin film transistor array substrate and the color filter substrate are stacked up and assembled together; and C. the liquid crystal layer is disposed between the thin film transistor array substrate and the color filter substrate, such that the first liquid crystal molecules in the first domain, the second liquid crystal molecules in the second domain, the third liquid crystal molecules in the third domain, and the fourth liquid crystal molecules in the fourth domain respectively have the first pretilt angle, the second pretilt angle, the third pretilt angle, and the fourth pretilt angle. The first depth corresponds to the first pretilt angle. The second depth corresponds to the second pretilt angle. The third depth corresponds to the third pretilt angle. The fourth depth corresponds to the fourth pretilt angle.

In the method for manufacturing the display panel, an area of the first domain is equal to an area of the second domain. An area of the third domain is equal to an area of the fourth domain. The third pretilt angle is smaller than the first pretilt angle and the second pretilt angle. The fourth pretilt angle is smaller than the first pretilt angle and the second pretilt angle. The step A comprises the following steps: a1. pixel electrodes are disposed in the first domain, the second domain, the third domain, and the fourth domain, such that the first depth of the grooves of the first pixel electrodes in the first domain, the second depth of the grooves of the second pixel electrodes in the second domain, the third depth of the grooves of the third pixel electrodes in the third domain, and the fourth depth of the grooves of the fourth pixel electrodes in the fourth domain are all the same; and a2. the pixel electrodes in the first domain and the second domain are etched, such that the first depth and the second depth are both smaller than the third depth.

In the method for manufacturing the display panel, the first pretilt angle and the second pretilt angle are both ranged from 87 degrees to 89 degrees. The third pretilt angle and the fourth pretilt angle are both ranged from 82 degrees to 84 degrees.

In the method for manufacturing the display panel, the first pretilt angle and the second pretilt angle are both 88 degrees. The third pretilt angle and the fourth pretilt angle are both 83 degrees.

In the method for manufacturing the display panel, an area of the second domain is smaller than an area of the first domain. An area of the third domain is greater than the area of the second domain. An area of the fourth domain is greater than the area of the third domain. The third pretilt angle is smaller than the first pretilt angle, the second pretilt angle, and the fourth pretilt angle. The step A comprises the following steps: a3. pixel electrodes are disposed in the first domain, the second domain, the third domain, and the fourth domain, such that the first depth of the grooves of the first pixel electrodes in the first domain, the second depth of the grooves of the second pixel electrodes in the second domain, the third depth of the grooves of the third pixel electrodes in the third domain, and the fourth depth of the grooves of the fourth pixel electrodes in the fourth domain are all the same; and a4. the pixel electrodes in the first domain, the second domain, and the fourth domain are etched, such that the first depth, the second depth, and the fourth depth are all smaller than the third depth.

In the method for manufacturing the display panel, the first pretilt angle, the second pretilt angle, and the fourth pretilt angle are all ranged from 87 degrees to 89 degrees. The third pretilt angle is ranged from 82 degrees to 84 degrees.

In the method for manufacturing the display panel, the first pretilt angle, the second pretilt angle, and the fourth pretilt angle are all 88 degrees. The third pretilt angle is 83 degrees.

Comparing with the prior art, the present invention is beneficial to improve the washout phenomenon at observation viewing angles with large viewing angles of a large-size display panel, thereby increasing the display quality of the large-size display panel at the observation viewing angles with the large viewing angles.

For a better understanding of the aforementioned content of the present invention, preferable embodiments are illustrated in accordance with the attached figures for further explanation.

BRIEF DESCRIPTION OF THE DRAWINGS

FIG. 12 shows a flowchart of a method for manufacturing a display panel in accordance with the present invention;

FIG. 13 shows a flowchart in Step 1201 of FIG. 12 in accordance with a first embodiment; and FIG. 14 shows a flowchart in Step 1201 of FIG. 12 in accordance with a second embodiment.

DETAILED DESCRIPTION OF THE INVENTION

The term "embodiment" in the specification refers to an implementation or an example of one or more of the inventions. Furthermore, as used in the description herein and throughout the claims that follow, the meaning of "a" includes plural reference unless the context clearly dictates otherwise.

A display panel in accordance with the present invention may be a TFT-LCD (Thin Film Transistor Liquid Crystal Display), an OLED (Organic Light Emitting Diode) display panel, and so on.

Figure 5:
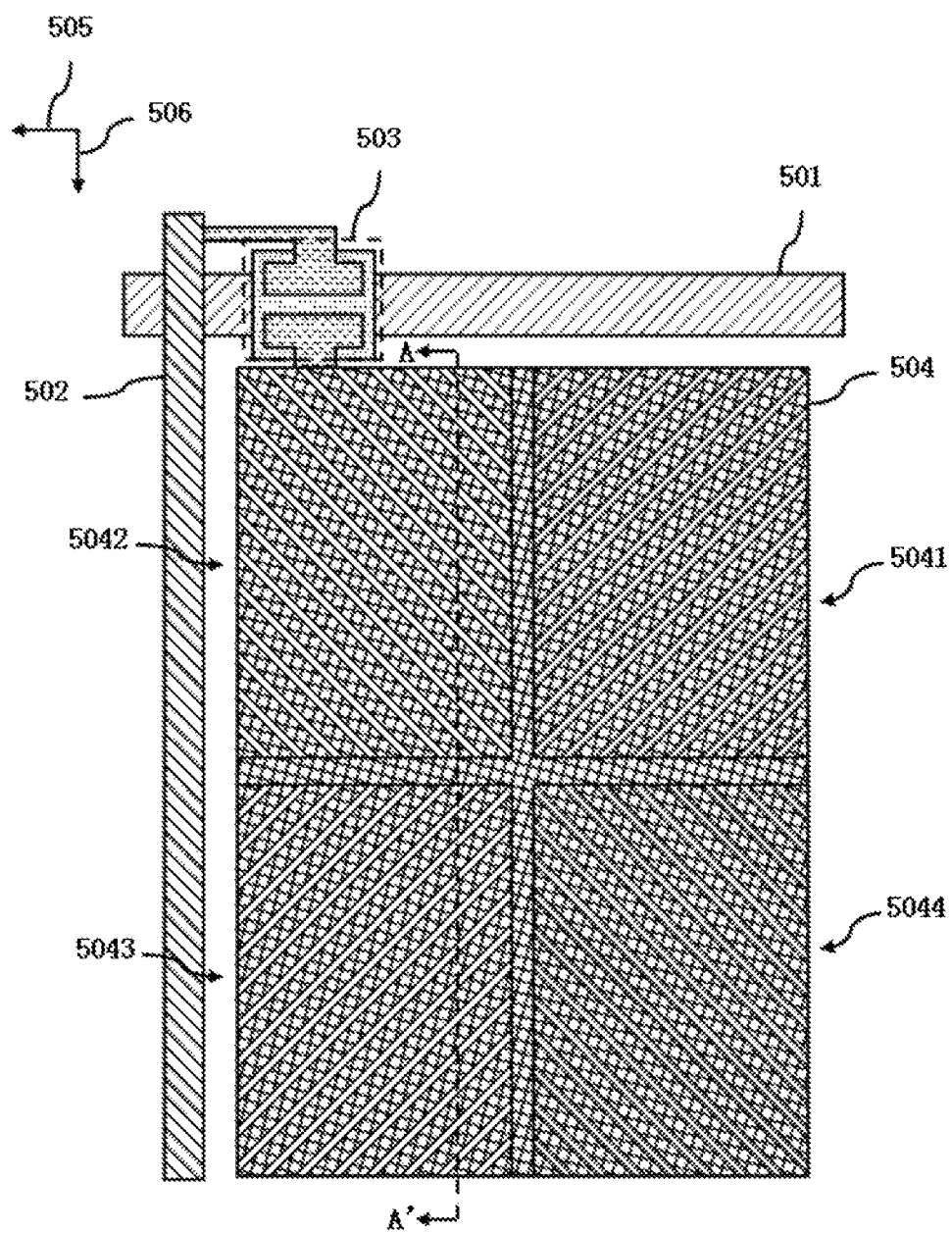
FIG. 5 shows a schematic of a thin film transistor array substrate of a display panel in accordance with a first embodiment of the present invention.
Figure 6:
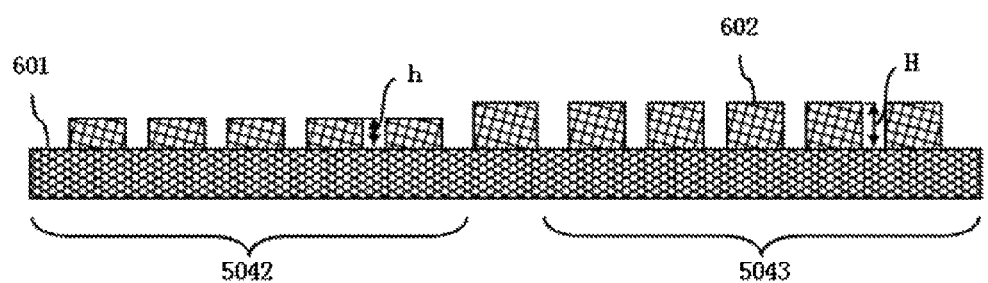
FIG. 6 shows a cross sectional schematic along A-A' in FIG. 5.

Please refer to FIG. 5 and FIG. 6. FIG. 5 shows a schematic of a thin film transistor array substrate of a display panel in accordance with a first embodiment of the present invention. FIG. 6 shows a cross sectional schematic along A-A' in FIG. 5.

The display panel of the present embodiment comprises a color filter substrate, a liquid crystal layer, and the thin film transistor array substrate. The thin film transistor array substrate, the liquid crystal layer, and the color filter substrate are stacked up and assembled together. Amongst, the thin film transistor array substrate comprises at least two pixel units 504. The at least two pixel units 504 are arranged in an array (two-dimensional array). Each of the pixel units 504 comprises a first domain 5041, a second domain 5042, a third domain 5043, and a fourth domain 5044. The first domain 5041 is disposed in an upper right quadrant of the pixel unit. The second domain 5042 is disposed in an upper left quadrant of the pixel unit. The third domain 5043 is disposed in a lower left quadrant of the pixel unit. The fourth domain 5041 is disposed in a lower right quadrant of the pixel unit. The thin film transistor array substrate further comprises at least one data line 502 and at least one scan line (gate line) 501. The data line 502 and the scan line 501 are electrically connected to a thin film transistor switch 503 of the pixel unit 504.

The first domain 5041 and the second domain 5042 are arranged in a first direction 505, while the third domain 5043 and the fourth domain 5044 are arranged in an opposite direction of the first direction 505. The first domain 5041 and the fourth domain 5044 are arranged in a second direction 506, while the second domain 5042 and the third domain 5043 are arranged in the second direction 506. The first direction 505 is perpendicular to the second direction 506. First liquid crystal molecules corresponding to the first domain 5041 have a first pretilt angle. Second liquid crystal molecules corresponding to the second domain 5042 have a second pretilt angle. Third liquid crystal molecules corresponding to the third domain 5043 have a third pretilt angle. Fourth liquid crystal molecules corresponding to the fourth domain 5044 have a fourth pretilt angle.

Grooves of first pixel electrodes in the first domain 5041 have a first depth, and the first depth corresponds to the first pretilt angle. Grooves of second pixel electrodes in the second domain 5042 have a second depth h, and the second depth h corresponds to the second pretilt angle. Grooves of third pixel electrodes in the third domain 5043 have a third depth H, and the third depth H corresponds to the third pretilt angle. Grooves of fourth pixel electrodes in the fourth domain 5044 have a fourth depth, and the fourth depth corresponds to the fourth pretilt angle. That is, the grooves of the first pixel electrodes having the first depth are utilized for making the first liquid crystal molecules have the first pretilt angle. The grooves of the second pixel electrodes having the second depth h are utilized for making the second liquid crystal molecules have the second pretilt angle. The grooves of the third pixel electrodes having the third depth H are utilized for making the third liquid crystal molecules have the third pretilt angle. The grooves of the fourth pixel electrodes having the fourth depth are utilized for making the fourth liquid crystal molecules have the fourth pretilt angle.

In the present embodiment, when the depths of the grooves of pixel electrodes 602 (the grooves of the first pixel electrodes, the grooves of the second pixel electrodes, the grooves of the third pixel electrodes, and the grooves of the fourth pixel electrodes) are greater, the pretilt angles (the first pretilt angle, the second pretilt angle, the third pretilt angle, and the fourth pretilt angle) of the corresponding liquid crystal molecules are smaller.

In the present embodiment, an area of the first domain 5041 is equal to an area of the second domain 5042, and an area of the third domain 5043 is equal to an area of the fourth domain 5044. For example, the area of the first domain 5041, the area of the second domain 5042, the area of the third domain 5043, and the area of the fourth domain 5044 are all the same.

The third pretilt angle is smaller than the first pretilt angle and the second pretilt angle. The fourth pretilt angle is smaller than the first pretilt angle and the second pretilt angle. For example, the first pretilt angle and the second pretilt angle are the same. The third pretilt angle and the fourth pretilt angle are the same. The third pretilt angle is smaller than the first pretilt angle.

The first depth and the second depth h are both smaller than the third depth H and the fourth depth.

The first pretilt angle and the second pretilt angle are both ranged from 86 degrees to 89 degrees, and the third pretilt angle and the fourth pretilt angle are both ranged from 81 degrees to 85 degrees.

Further, the first pretilt angle and the second pretilt angle are both ranged from 87 degrees to 89 degrees, and the third pretilt angle and the fourth pretilt angle are both ranged from 82 degrees to 84 degrees.

Preferably, the first pretilt angle and the second pretilt angle are both 88 degrees, and the third pretilt angle and the fourth pretilt angle are both 83 degrees.

In the above-mentioned technical scheme, it is beneficial to improve the washout phenomenon at observation viewing angles with large viewing angles of a large-size display panel, thereby increasing the display quality of the large-size display panel at the observation viewing angles with the large viewing angles.

Figure 7:
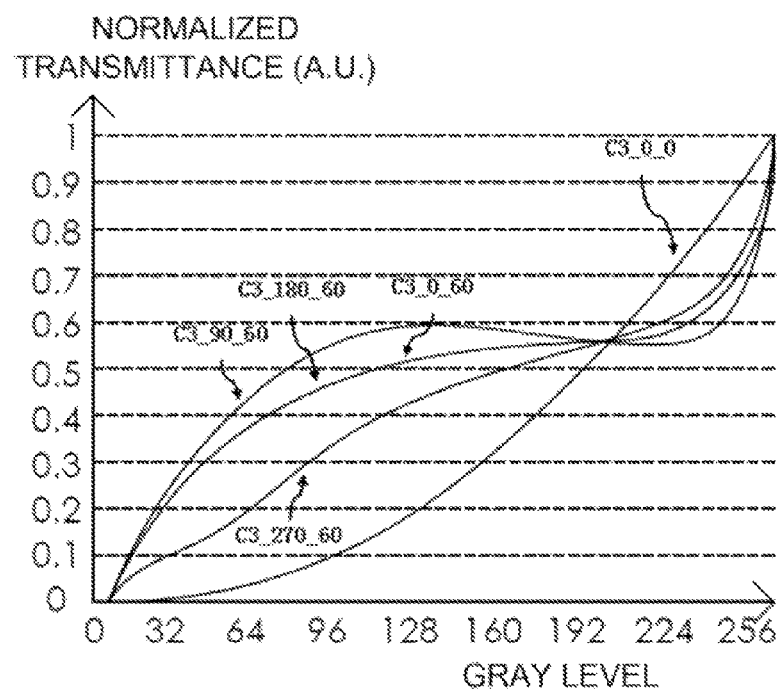
FIG. 7 shows a simulation diagram by performing a gamma simulation to the subpixel of FIG. 5 and FIG. 6.

A result of a gamma curve simulation of the present embodiment by using an optical software for liquid crystals is shown in FIG. 7. Amongst, at a viewing angle of 60 degrees of the display panel of the present embodiment, curves C3_0_60, C3_90_60, C3_180_60, and C3_270_60 respectively represent gamma curves with respect to directions corresponding to the first azimuth 0 degree, the second azimuth 90 degrees, the third azimuth 180 degrees, and the fourth azimuth 270 degrees. A curve C3_0_0 represents a gamma curve with respect to a direction corresponding to the first azimuth 0 degree at a viewing angle of 0 degree of the display panel of the present embodiment. It can be seen from FIG. 7 that the washout effect at the downward viewing angle is best, and the washout effect at the upward viewing angle is worst.

Figure 1:
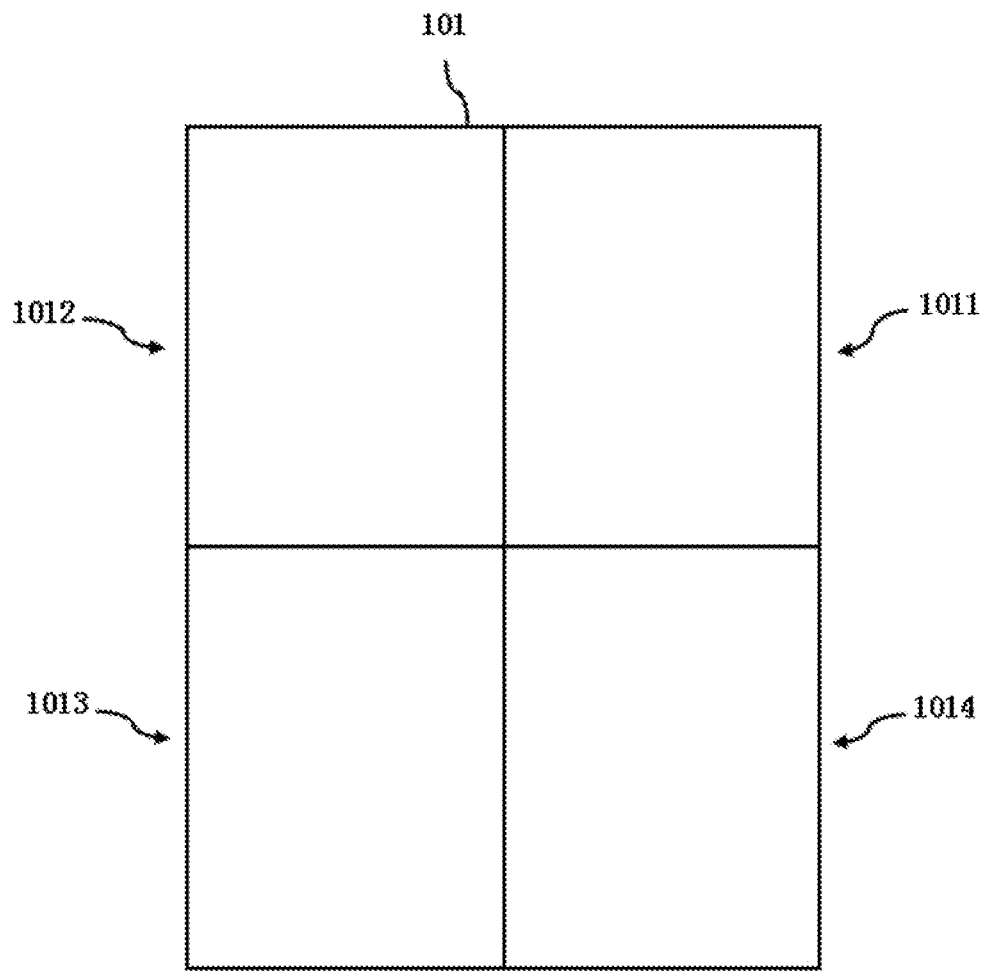
FIG. 1 shows a schematic of a subpixel of a first type of a conventional display panel.
Figure 2:
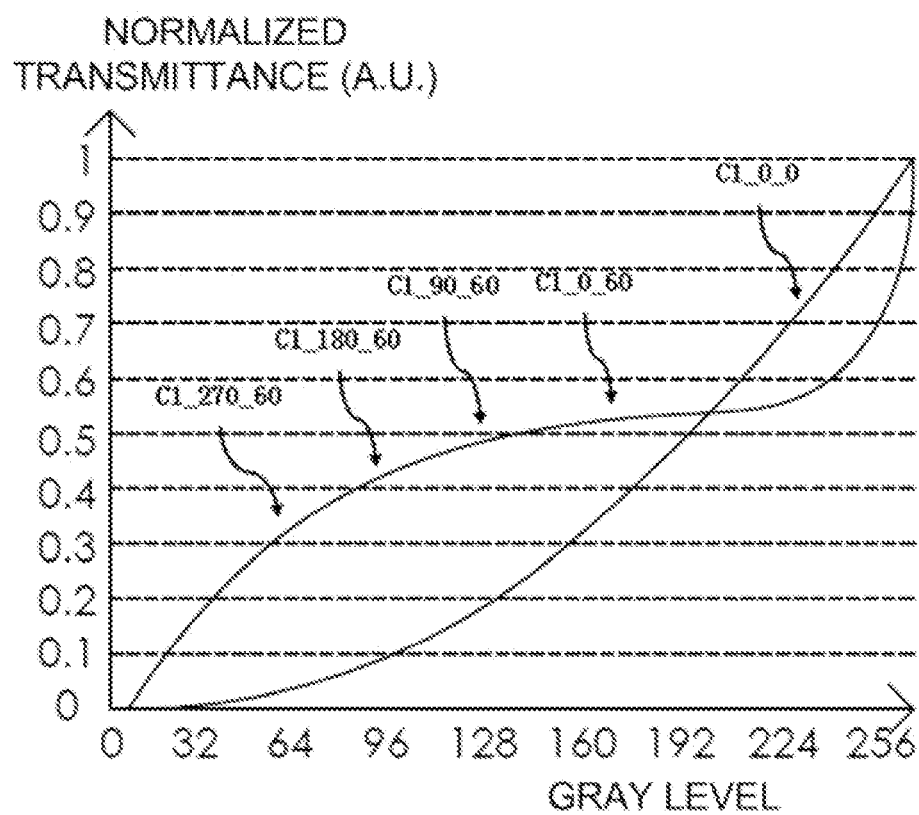
FIG. 2 shows a simulation diagram by performing a gamma simulation to the subpixel of FIG. 1.
Figure 3:
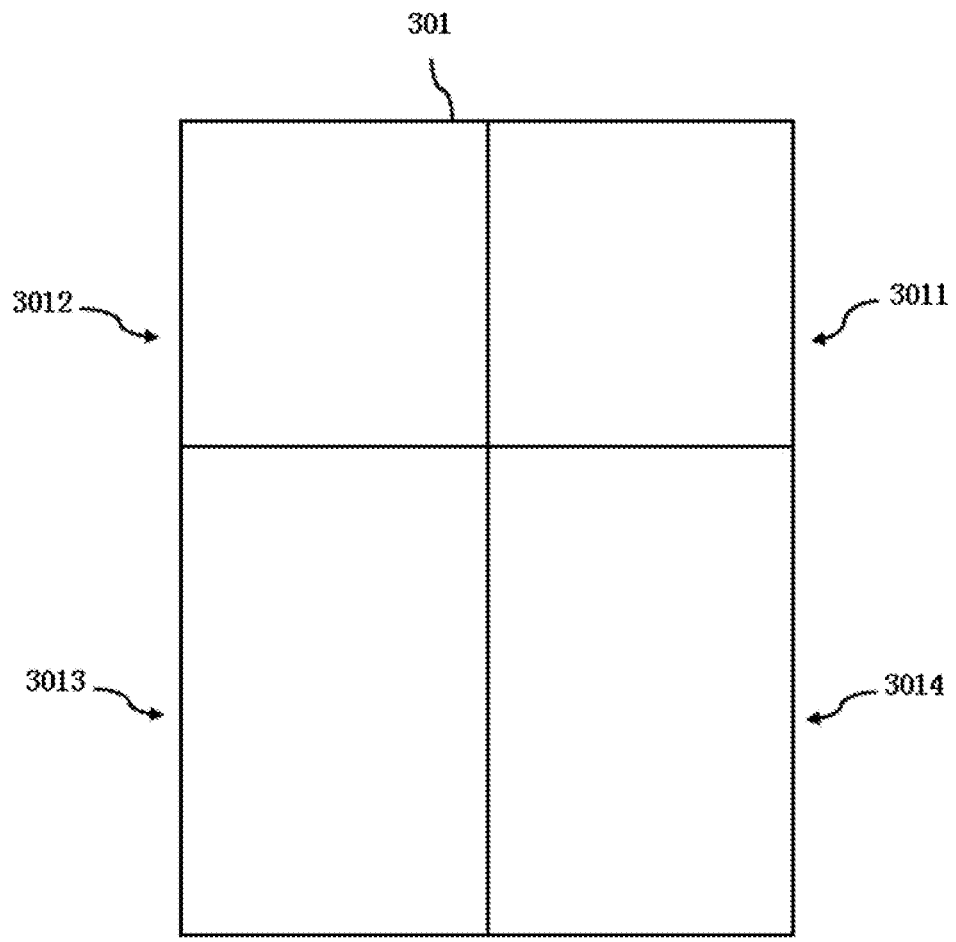
FIG. 3 shows a schematic of a subpixel of a second type of a conventional display panel.
Figure 4:
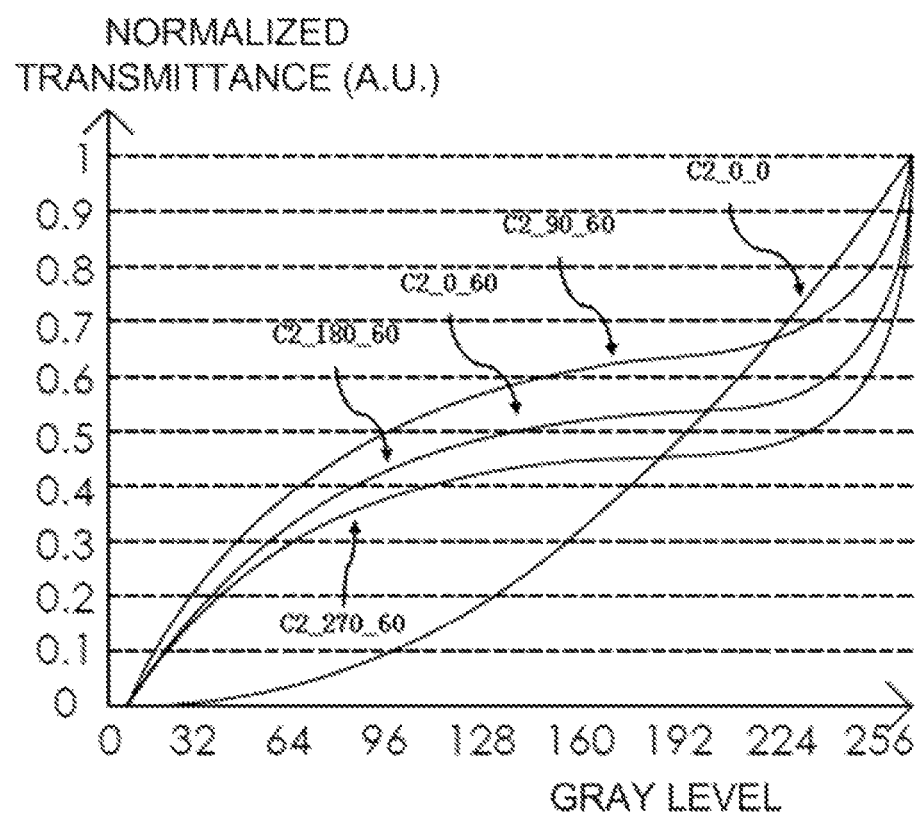
FIG. 4 shows a simulation diagram by performing a gamma simulation to the subpixel of FIG. 3.
Figure 8:
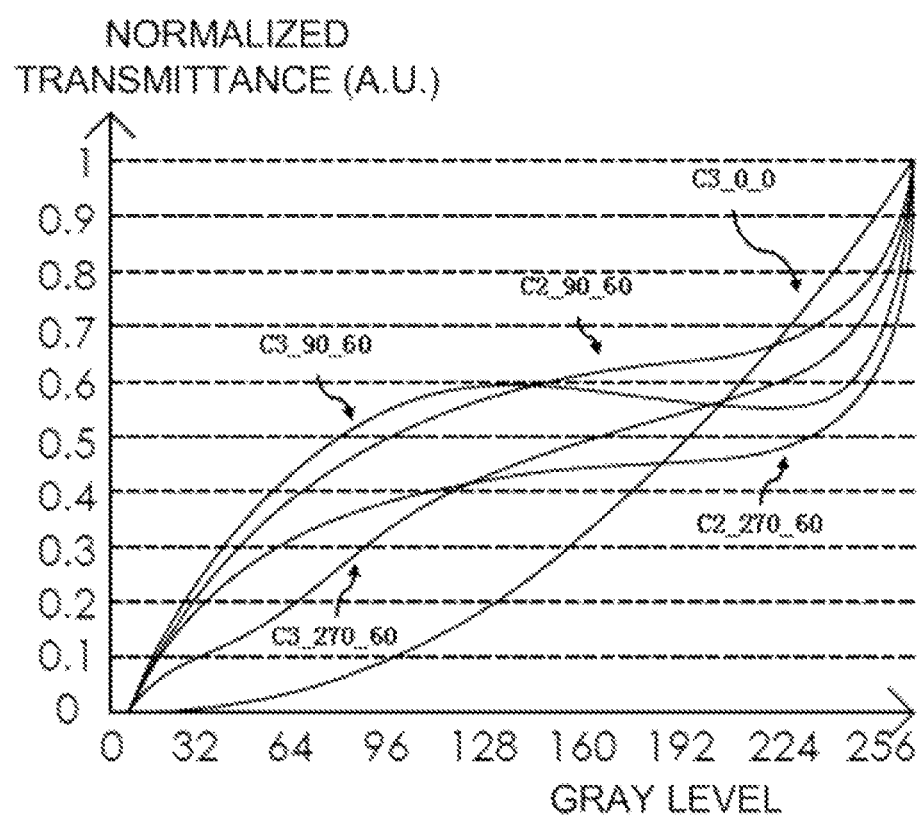
FIG. 8 shows a schematic which compares gamma curves at the upward and downward viewing angles in FIG. 7 and FIG. 4.

By comparing the curves at the upward and downward viewing angles in the simulation diagram of the present embodiment with the curves at the upward and downward viewing angles in FIG. 4, a comparison result is acquired as shown in FIG. 8. It can be seen from FIG. 8 that the curve at the downward viewing angle of the display panel of the present embodiment is close to the standard 2.2 gamma curve in a low gray level region and a high gray level region. Accordingly, the washout effect is better.

Figure 9:
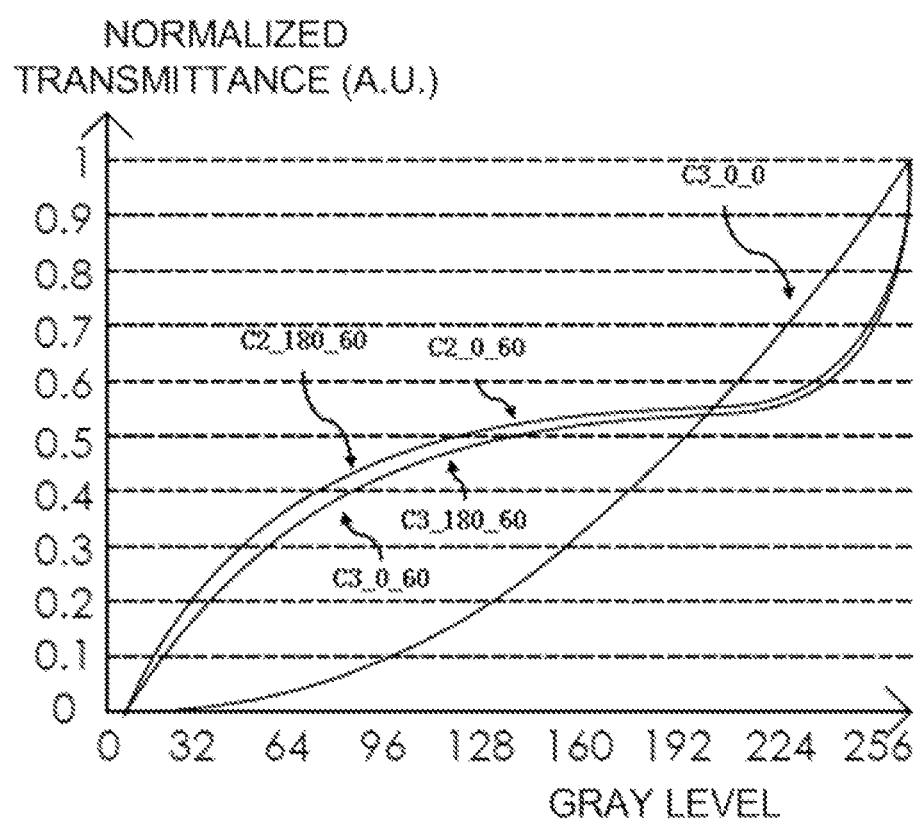
FIG. 9 shows a schematic which compares gamma curves at the left and right viewing angles in FIG. 7 and FIG. 4.

By comparing the curves at the left and right viewing angles in the simulation diagram of the present embodiment with the curves at the left and right viewing angles in FIG. 4, a comparison result is acquired as shown in FIG. 9. It can be seen from FIG. 9 that the curves at the left and right viewing angles of the display panel of the present embodiment is more close to the standard 2.2 gamma curve than those of the above-mentioned second conventional display panel in a low gray level region. Accordingly, the washout effect is better.

In conclusion, in the present embodiment, changing the pretilt angles not only can achieve the effect which is acquired by changing the areas in the technical scheme in the prior art, but also can obviously improve the washout effect.

Figure 10:
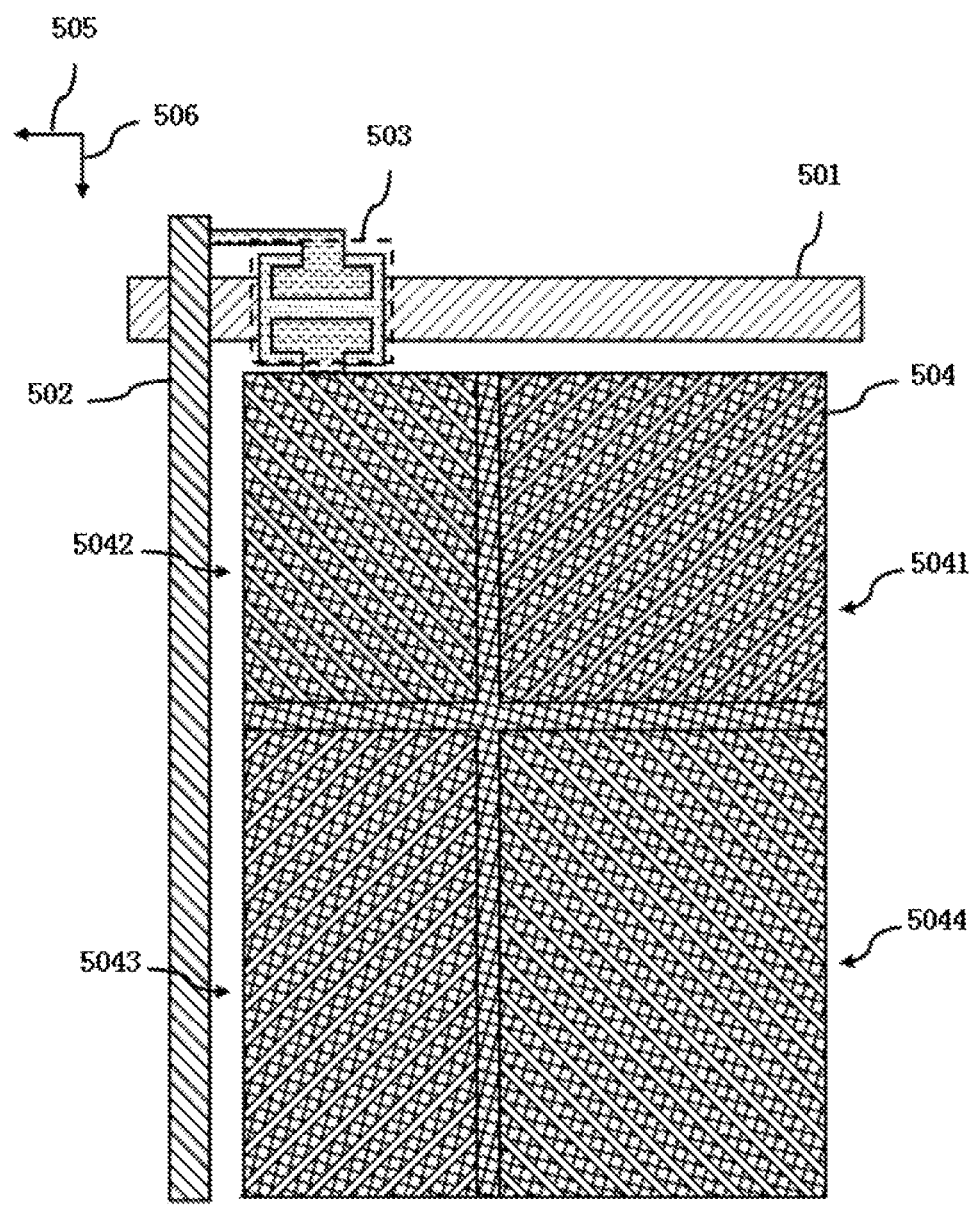
FIG. 10 shows a schematic of a thin film transistor array substrate of a display panel in accordance with a second embodiment of the present invention.

Please refer to FIG. 10. FIG. 10 shows a schematic of a thin film transistor array substrate of a display panel in accordance with a second embodiment of the present invention. The present embodiment is similar to the above-mentioned first embodiment. Differences are described as follows.

An area of the second domain 5042 is smaller than an area of the first domain 5041. An area of the third domain 5043 is larger than the area of the second domain 5042. An area of the fourth domain 5044 is larger than the area of the third domain 5043. For example, the area of the first domain 5041 occupies 24 percent of the area of the pixel electrodes (including the first pixel electrodes, the second pixel electrodes, the third pixel electrodes, and the fourth pixel electrodes) 602. The area of the second domain 5042 occupies 16 percent of the area of the pixel electrodes 602. The area of the third domain 5043 occupies 24 percent of the area of the pixel electrodes 602. The area of the fourth domain 5044 occupies 36 percent of the area of the pixel electrodes 602.

The third pretilt angle is smaller than the first pretilt angle, the second pretilt angle, and the fourth pretilt angle. For example, the first pretilt angle, the second pretilt angle, and the fourth pretilt angle are all the same. The third pretilt angle is smaller than the second pretilt angle.

The first depth, the second depth h, and the fourth depth are smaller than the third depth H.

The first pretilt angle, the second pretilt angle, and the fourth pretilt angle are all ranged from 86 degrees to 89 degrees. The third pretilt angle is ranged from 81 degrees to 85 degrees.

Further, the first pretilt angle, the second pretilt angle, and the fourth pretilt angle are all ranged from 87 degrees to 89 degrees. The third pretilt angle is ranged from 82 degrees to 84 degrees.

Preferably, the first pretilt angle, the second pretilt angle, and the fourth pretilt angle are all 88 degrees. The third pretilt angle is 83 degrees.

In the above-mentioned technical scheme, it is beneficial to improve the display quality at observation viewing angles of the left, right, and downward viewing angles of a large-size display panel.

Figure 11:
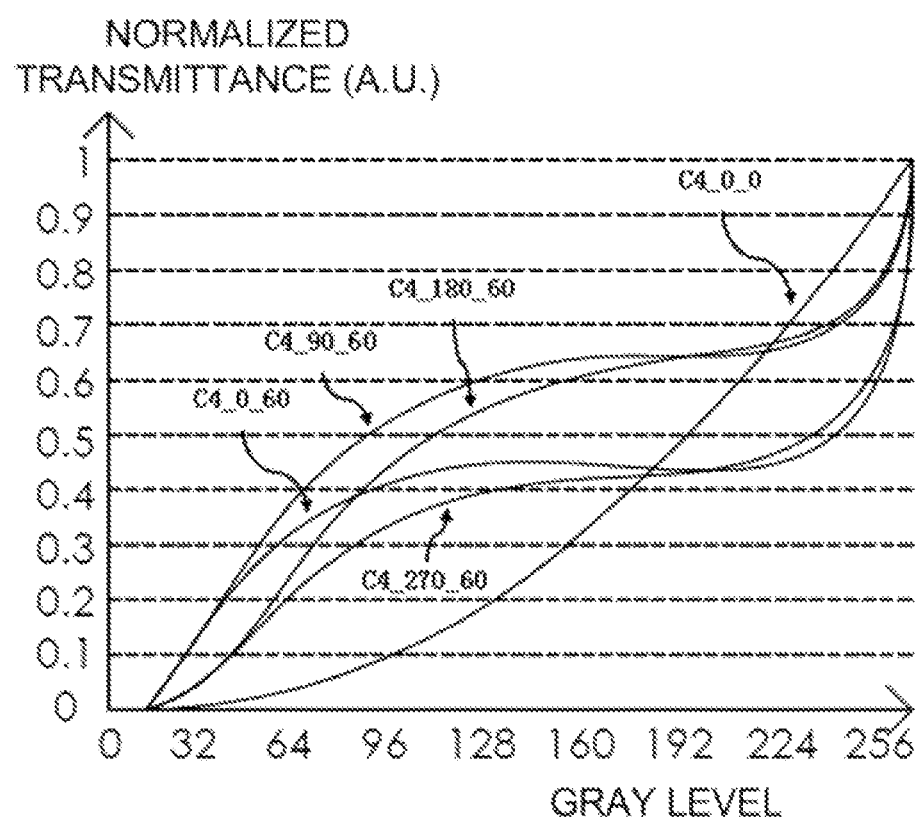
FIG. 11 shows a simulation diagram by performing a gamma simulation to the subpixel of FIG. 10.

A result of a gamma curve simulation of the present embodiment by using an optical software for liquid crystals is shown in FIG. 11. Amongst, at a viewing angle of 60 degrees of the display panel of the present embodiment, curves C4_0_60, C4_90_60, C4_180_60, and C4_270_60 respectively represent gamma curves with respect to directions corresponding to the first azimuth 0 degree, the second azimuth 90 degrees, the third azimuth 180 degrees, and the fourth azimuth 270 degrees. A curve C4_0_0 represents a gamma curve with respect to a direction corresponding to the first azimuth 0 degree at a viewing angle of 0 degree of the display panel of the present embodiment. FIG. 11 shows that the washout effect at the downward viewing angle is best, and the washout effect at the upward viewing angle is worst. The washout effects at the left and right viewing angles alternately appear with the increase of the gray levels.

Please refer to FIG. 12. FIG. 12 shows a flowchart of a method for manufacturing a display panel in accordance with the present invention.

The method for manufacturing the display panel of the present embodiment comprises the following steps.

A. (Step 1201): the first domain 5041, the second domain 5042, the third domain 5043, and the fourth domain 5044 are disposed in each of the pixel units 504 of the thin film transistor array substrate, such that the grooves of the first pixel electrodes in the first domain 5041 have the first depth, the grooves of the second pixel electrodes in the second domain 5042 have the second depth h, the grooves of the third pixel electrodes in the third domain 5043 have the third depth H, and the grooves of the fourth pixel electrodes in the fourth domain 5044 have the fourth depth.

B. (Step 1202): the thin film transistor array substrate and the color filter substrate are stacked up and assembled together.

C. (Step 1203): the liquid crystal layer is disposed between the thin film transistor array substrate and the color filter substrate, such that the first liquid crystal molecules in the first domain 5041, the second liquid crystal molecules in the second domain 5042, the third liquid crystal molecules in the third domain 5043, and the fourth liquid crystal molecules in the fourth domain 5044 respectively have the first pretilt angle, the second pretilt angle, the third pretilt angle, and the fourth pretilt angle.

Amongst, the first depth corresponds to the first pretilt angle. The second depth h corresponds to the second pretilt angle. The third depth H corresponds to the third pretilt angle. The fourth depth corresponds to the fourth pretilt angle.

The grooves of the first pixel electrodes having the first depth are utilized for making the first liquid crystal molecules have the first pretilt angle. The grooves of the second pixel electrodes having the second depth h are utilized for making the second liquid crystal molecules have the second pretilt angle. The grooves of the third pixel electrodes having the third depth H are utilized for making the third liquid crystal molecules have the third pretilt angle. The grooves of the fourth pixel electrodes having the fourth depth are utilized for making the fourth liquid crystal molecules have the fourth pretilt angle.

In the present embodiment, when the depths of the grooves of the pixel electrodes 602 (the grooves of the first pixel electrodes, the grooves of the second pixel electrodes, the grooves of the third pixel electrodes, and the grooves of the fourth pixel electrodes) are greater, the pretilt angles of the corresponding liquid crystal molecules are smaller.

Please refer to FIG. 13. FIG. 13 shows a flowchart in Step 1201 of FIG. 12 in accordance with a first embodiment.

In the present embodiment, the area of the first domain 5041 is equal to the area of the second domain 5042. The area of the third domain 5043 is equal to the area of the fourth domain 5044.

The third pretilt angle is smaller than the first pretilt angle and the second pretilt angle. The fourth pretilt angle is smaller than the first pretilt angle and the second pretilt angle. For example, the first pretilt angle is equal to the second pretilt angle. The third pretilt angle is equal to the fourth pretilt angle. The third pretilt angle is smaller than the first pretilt angle.

Step A (Step 1201) comprises the following steps.

a1. (Step 12011): the pixel electrodes 602 are disposed in the first domain 5041, the second domain 5042, the third domain 5043, and the fourth domain 5044. For example, the pixel electrodes 602 are formed on the array substrate 601 by a sputtering method, such that the first depth of the grooves of the first pixel electrodes in the first domain 5041, the second depth h of the grooves of the second pixel electrodes in the second domain 5042, the third depth H of the grooves of the third pixel electrodes in the third domain 5043, and the fourth depth of the grooves of the fourth pixel electrodes in the fourth domain 5044 are all the same.

a2. (Step 12012): the pixel electrodes 602 in the first domain 5041 and the second domain 5042 are etched, such that the first depth and the second depth h are smaller than the third depth H. For example, at least parts of the pixel electrodes 602 in the first domain 5041 and the second domain 5042 are removed by a photomask manufacturing process.

In the present embodiment, the first pretilt angle and the second pretilt angle are both ranged from 86 degrees to 89 degrees. The third pretilt angle and the fourth pretilt angle are both ranged from 81 degrees to 85 degrees.

Further, the first pretilt angle and the second pretilt angle are both ranged from 87 degrees to 89 degrees. The third pretilt angle and the fourth pretilt angle are both ranged from 82 degrees to 84 degrees.

Preferably, the first pretilt angle and the second pretilt angle are both 88 degrees. The third pretilt angle and the fourth pretilt angle are both 83 degrees.

In the above-mentioned technical scheme, it is beneficial to improve the washout phenomenon at observation viewing angles with large viewing angles of a large-size display panel, thereby increasing the display quality of the large-size display panel at the observation viewing angles with the large viewing angles.

Please refer to FIG. 14. FIG. 14 shows a flowchart in Step 1201 of FIG. 12 in accordance with a second embodiment. The present embodiment is similar to the first embodiment. Differences are described as follows.

The area of the second domain 5042 is smaller than the area of the first domain 5041. The area of the third domain 5043 is greater than the area of the second domain 5042. The area of the fourth domain 5044 is greater than the area of the third domain 5043. For example, the area of the first domain 5041 occupies 24 percent of the area of the pixel electrodes (including the first pixel electrodes, the second pixel electrodes, the third pixel electrodes, and the fourth pixel electrodes) 602. The area of the second domain 5042 occupies 16 percent of the area of the pixel electrodes 602. The area of the third domain 5043 occupies 24 percent of the area of the pixel electrodes 602. The area of the fourth domain 5044 occupies 36 percent of the area of the pixel electrodes 602.

The third pretilt angle is smaller than the first pretilt angle, the second pretilt angle, and the fourth pretilt angle. For example, the first pretilt angle, the second pretilt angle, and the fourth pretilt angle are all the same. The third pretilt angle is smaller than the second pretilt angle.

Step A (Step 1201) comprises the following steps.

a3. (Step 12013): the pixel electrodes 602 are disposed in the first domain 5041, the second domain 5042, the third domain 5043, and the fourth domain 5044. For example, the pixel electrodes 602 are formed on the array substrate 601 by a sputtering method, such that the first depth of the grooves of the first pixel electrodes in the first domain 5041, the second depth h of the grooves of the second pixel electrodes in the second domain 5042, the third depth H of the grooves of the third pixel electrodes in the third domain 5043, and the fourth depth of the grooves of the fourth pixel electrodes in the fourth domain 5044 are all the same.

a4. (Step 12014): the pixel electrodes 602 in the first domain 5041, the second domain 5042, and the fourth domain 5044 are etched, such that the first depth, the second depth h, and the fourth depth are all smaller than the third depth H. For example, at least parts of the pixel electrodes 602 in the first domain 5041, the second domain 5042, and the fourth domain 5044 are removed by a photomask manufacturing process.

In the present embodiment, the first pretilt angle, the second pretilt angle, and the fourth pretilt angle are all ranged from 86 degrees to 89 degrees. The third pretilt angle is ranged from 81 degrees to 85 degrees.

Further, the first pretilt angle, the second pretilt angle, and the fourth pretilt angle are all ranged from 87 degrees to 89 degrees. The third pretilt angle is ranged from 82 degrees to 84 degrees.

Preferably, the first pretilt angle, the second pretilt angle, and the fourth pretilt angle are all 88 degrees. The third pretilt angle is 83 degrees.

In the above-mentioned technical scheme, it is beneficial to improve the display quality at observation viewing angles of the left, right, and downward viewing angles of a large-size display panel.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structures.

What is claimed is:

1. A display panel, wherein the display panel comprises:
    a color filter substrate;
    a liquid crystal layer; and
    a thin film transistor array substrate, the thin film transistor array substrate, the liquid crystal layer, and the color filter substrate are stacked up and assembled together, wherein the thin film transistor array substrate comprises:
    at least two pixel units divided into four quadrants, the at least two pixel units are arranged in an array, each of the pixel units comprises:
    a first domain disposed in an upper right quadrant of the pixel unit, first liquid crystal molecules corresponding to the first domain have a first pretilt angle;
    a second domain disposed in an upper left quadrant of the pixel unit, second liquid crystal molecules corresponding to the second domain have a second pretilt angle;
    a third domain disposed in a lower left quadrant of the pixel unit, third liquid crystal molecules corresponding to the third domain have a third pretilt angle; and
    a fourth domain disposed in a lower right quadrant of the pixel unit, fourth liquid crystal molecules corresponding to the fourth domain have a fourth pretilt angle;
    wherein the first domain and the second domain are arranged in a first direction, the third domain and the fourth domain are arranged in an opposite direction of the first direction, the first domain and the fourth domain are arranged in a second direction, the second domain and the third domain are arranged in the second direction, and the first direction is perpendicular to the second direction,
    wherein an area of the second domain is smaller than an area of the first domain, an area of the third domain is greater than the area of the second domain, and an area of the fourth domain is greater than the area of the third domain;
    the third pretilt angle is smaller than the first pretilt angle, the second pretilt angle, and the fourth pretilt angle.

2. The display panel of claim 1, wherein grooves of first pixel electrodes in the first domain have a first depth, and the first depth corresponds to the first pretilt angle;
    grooves of second pixel electrodes in the second domain have a second depth, and the second depth corresponds to the second pretilt angle;
    grooves of third pixel electrodes in the third domain have a third depth, and the third depth corresponds to the third pretilt angle;
    grooves of fourth pixel electrodes in the fourth domain have a fourth depth, and the fourth depth corresponds to the fourth pretilt angle.

3. The display panel of claim 1, wherein the first pretilt angle is ranged from 86 degrees to 89 degrees;
    the third pretilt angle is ranged from 81 degrees to 85 degrees.

4. The display panel of claim 3, wherein the first pretilt angle, the second pretilt angle, and the fourth pretilt angle are all ranged from 87 degrees to 89 degrees, and the third pretilt angle is ranged from 82 degrees to 84 degrees.

5. The display panel of claim 4, wherein the first pretilt angle, the second pretilt angle, and the fourth pretilt angle are all 88 degrees, and the third pretilt angle is 83 degrees.

6. A method for manufacturing the display panel of claim 1, wherein the method comprises the following steps:
    A. disposing the first domain, the second domain, the third domain, and the fourth domain in the upper right quadrant, the upper left quadrant, the lower left quadrant and the lower right quadrant, respectively in each of the pixel units of the thin film transistor array substrate, such that grooves of first pixel electrodes in the first domain have a first depth, grooves of second pixel electrodes in the second domain have a second depth, grooves of third pixel electrodes in the third domain have a third depth, and grooves of fourth pixel electrodes in the fourth domain have a fourth depth;

B. stacking and assembling the thin film transistor array substrate and the color filter together;

C. disposing the liquid crystal layer between the thin film transistor array substrate and the color filter substrate, such that the first liquid crystal molecules in the first domain, the second liquid crystal molecules in the second domain, the third liquid crystal molecules in the third domain, and the fourth liquid crystal molecules in the fourth domain respectively have the first pretilt angle, the second pretilt angle, the third pretilt angle, and the fourth pretilt angle;

wherein the first depth corresponds to the first pretilt angle, the second depth corresponds to the second pretilt angle, the third depth corresponds to the third pretilt angle, and the fourth depth corresponds to the fourth pretilt angle, wherein an area of the second domain is smaller than an area of the first domain, an area of the third domain is greater than the area of the second domain, and an area of the fourth domain is greater than the area of the third domain;

the third pretilt angle is smaller than the first pretilt angle, the second pretilt angle, and the fourth pretilt angle;

the step A comprises the following steps:

disposing pixel electrodes in the first domain, the second domain, the third domain, and the fourth domain, such that the first depth of one of the grooves of the first pixel electrodes in the first domain is the same as the first depth of another one of the grooves of the first pixel electrodes in the first domain, the second depth of one of the grooves of the second pixel electrodes in the second domain is the same as the second depth of another one of the grooves of the second pixel electrodes in the second domain, the third depth of one of the grooves of the third pixel electrodes in the third domain is the same as the third depth of another one of the grooves of the third pixel electrodes in the third domain, and the fourth depth of one of the grooves of the fourth pixel electrodes in the fourth domain is the same as the fourth depth of another one of the grooves of the fourth pixel electrodes in the fourth domain;

etching the pixel electrodes in the first domain, the second domain, and the fourth domain, such that the first depth of the grooves of the first pixel electrodes in the first domain, the second depth of the grooves of the second pixel electrodes in the second domain, and the fourth depth of the grooves of the fourth pixel electrodes in the fourth domain are smaller than the third depth of the grooves of the third pixel electrodes in the third domain.

7. The method for manufacturing the display panel of claim 6, wherein the first pretilt angle, the second pretilt angle, and the fourth pretilt angle are all ranged from 87 degrees to 89 degrees, and the third pretilt angle is ranged from 82 degrees to 84 degrees.

8. The method for manufacturing the display panel of claim 7, wherein the first pretilt angle, the second pretilt angle, and the fourth pretilt angle are all 88 degrees, and the third pretilt angle is 83 degrees.

* * * * *